US009448721B2

(12) United States Patent
Wu et al.

(10) Patent No.: US 9,448,721 B2
(45) Date of Patent: Sep. 20, 2016

(54) ELECTRONIC DEVICE INCLUDING TOUCH-SENSITIVE INPUT DEVICE AND METHOD OF DETERMINING SELECTION

(75) Inventors: Ken Wu, Burlington (CA); Robert Lowles, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1845 days.

(21) Appl. No.: 12/051,413

(22) Filed: Mar. 19, 2008

(65) Prior Publication Data
US 2009/0237362 A1 Sep. 24, 2009

(51) Int. Cl.
*G06F 3/041* (2006.01)
*G06F 3/0488* (2013.01)

(52) U.S. Cl.
CPC .................. *G06F 3/04886* (2013.01)

(58) Field of Classification Search
CPC .... G06F 3/04886; G06F 3/047; G06F 3/046; G06F 3/0418; G06F 2203/041; G06F 3/03547; G06F 3/0412; G06F 3/0414; G06F 3/0416; H05K 9/0088; H05K 9/0081; H05K 9/0079; H05K 9/0073
USPC ................................. 345/173, 174
See application file for complete search history.

(56) References Cited

U.S. PATENT DOCUMENTS

| 5,543,588 A | 8/1996 | Bisset et al. |
| 5,574,482 A | 11/1996 | Niemeier |
| 5,825,352 A | 10/1998 | Bisset et al. |
| 7,176,586 B2 | 2/2007 | Ledford et al. |
| 7,444,163 B2 * | 10/2008 | Ban et al. .................. 455/550.1 |
| 2004/0119484 A1 | 6/2004 | Basir et al. |
| 2005/0052425 A1 * | 3/2005 | Zadesky et al. .............. 345/173 |
| 2005/0110768 A1 * | 5/2005 | Marriott et al. .............. 345/173 |
| 2005/0162402 A1 * | 7/2005 | Watanachote ................ 345/173 |
| 2005/0259087 A1 * | 11/2005 | Hoshino et al. .............. 345/173 |
| 2006/0097991 A1 * | 5/2006 | Hotelling et al. ............ 345/173 |
| 2008/0001927 A1 * | 1/2008 | Yoshida ........................ 345/173 |

FOREIGN PATENT DOCUMENTS

| EP | 1555601 A2 | 7/2005 |
| GB | 2380583 | 4/2003 |
| WO | 97/18547 | 5/1997 |
| WO | 2006/020305 A2 | 2/2006 |

OTHER PUBLICATIONS

Examination Report, European Patent Application No. 08153041.2 dated Sep. 4, 2008.
"Multi-Touch Screen", http://geeksaresexy.blogspot.com/2006/05/multi-touch-screen.html, May 29, 2006.
Office Action dated Nov. 23, 2012 issued in respect of corresponding European Patent Application No. 08153041.2.
Examiner's Report dated Aug. 5, 2013, issued in respect of corresponding Canadian Patent Application No. 2,654,127.

* cited by examiner

*Primary Examiner* — Kumar Patel
*Assistant Examiner* — Insa Sadio
(74) *Attorney, Agent, or Firm* — Borden Ladner Gervais LLP; Geoffrey deKleine (57) ABSTRACT

A method of determining user-selections from at least one touch at a touch-sensitive input surface of an electronic device includes determining a first user-selection based on touch attributes, detecting changes in the touch attributes including a change in size and a change in the location, and determining a second user-selection based on a direction of the change in location.

15 Claims, 4 Drawing Sheets

ELECTRONIC DEVICE INCLUDING TOUCH-SENSITIVE INPUT DEVICE AND METHOD OF DETERMINING SELECTION

FIELD OF TECHNOLOGY

The present application relates to electronic devices with touch-sensitive input surfaces and to the determination of user-selections at the input surface.

BACKGROUND

Electronic devices, including portable electronic devices, have gained widespread use and can provide a variety of functions including, for example, telephonic, electronic messaging and other personal information manager (PIM) application functions. Portable electronic devices can include several types of devices including mobile stations such as simple cellular telephones, smart telephones, wireless PDAs, and laptop computers with wireless 802.11 or Bluetooth capabilities. These devices run on a wide variety of networks from data-only networks such as Mobitex and DataTAC to complex voice and data networks such as GSM/GPRS, CDMA, EDGE, UMTS and CDMA2000 networks.

Devices such as PDAs or smart telephones are generally intended for handheld use and ease of portability. Smaller devices are generally desirable for portability. Touch screen devices constructed of a display, such as a liquid crystal display, with a touch-sensitive overlay are useful on such handheld devices as such handheld devices are small and are therefore limited in space available for user input and output devices. Further, the screen content on the touch screen devices can be modified depending on the functions and operations being performed.

These touch-screen devices suffer from disadvantages, however, as the resolution of such touch-screen devices is limited when determining multiple touch inputs. When two closely-spaced options are selected from a graphical user interface, particularly when the second option is selected by touching while the user is still touching the touch screen display at the first option, the user-selected options are not correctly determined. Instead, a single touch input is commonly detected, rather than multiple touch inputs. Further, resolution of the touch-screen devices is insufficient to determine which of the options the user is attempting to select when closely-spaced, adjacent options are touched. This is particularly problematic when, for example, virtual keyboards are provided for user-selection of virtual buttons as selection of adjacent buttons on the keyboard is not correctly resolved.

Improvements in portable electronic devices are therefore desirable.

BRIEF DESCRIPTION OF THE DRAWINGS

Embodiments of the present application will now be described, by way of example only, with reference to the attached Figures, wherein.

DETAILED DESCRIPTION

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limited to the scope of the embodiments described herein.

The application generally relates to an electronic device, which in the embodiments described herein is a portable electronic device. Examples of portable electronic devices include mobile, or handheld, wireless communication devices such as pagers, cellular phones, cellular smart-phones, wireless organizers, personal digital assistants, wirelessly enabled notebook computers and the like.

The portable electronic device may be a two-way communication device with advanced data communication capabilities including the capability to communicate with other portable electronic devices or computer systems through a network of transceiver stations. The portable electronic device may also have the capability to allow voice communication. Depending on the functionality provided by the portable electronic device, it may be referred to as a data messaging device, a two-way pager, a cellular telephone with data messaging capabilities, a wireless Internet appliance, or a data communication device (with or without telephony capabilities). The portable electronic device may also be a portable device without wireless communication capabilities as a handheld electronic game device, digital photograph album, digital camera and the like.

Reference is first made to the Figures to describe an embodiment of a portable electronic device, indicated generally by the numeral 20. The portable electronic device 20 includes a housing 74, a display device 32 exposed by the housing and an input device which in the present embodiment is a touch-sensitive overlay 34 connected to a controller 36 for receiving user-input. The portable electronic device 20 also includes functional components housed in the housing. The functional components include a memory device such as the flash memory 30 and a processor 22 connected to the display device 32, the input device (touch-sensitive overlay 34) and the memory device. The memory device is provided for storage of computer-readable program code executable by the processor 22 for determining a first user-selection based on touch attributes, detecting changes in the touch attributes including a change in the location, and determining a second user-selection based on a direction of the change in location.

Figure 1:
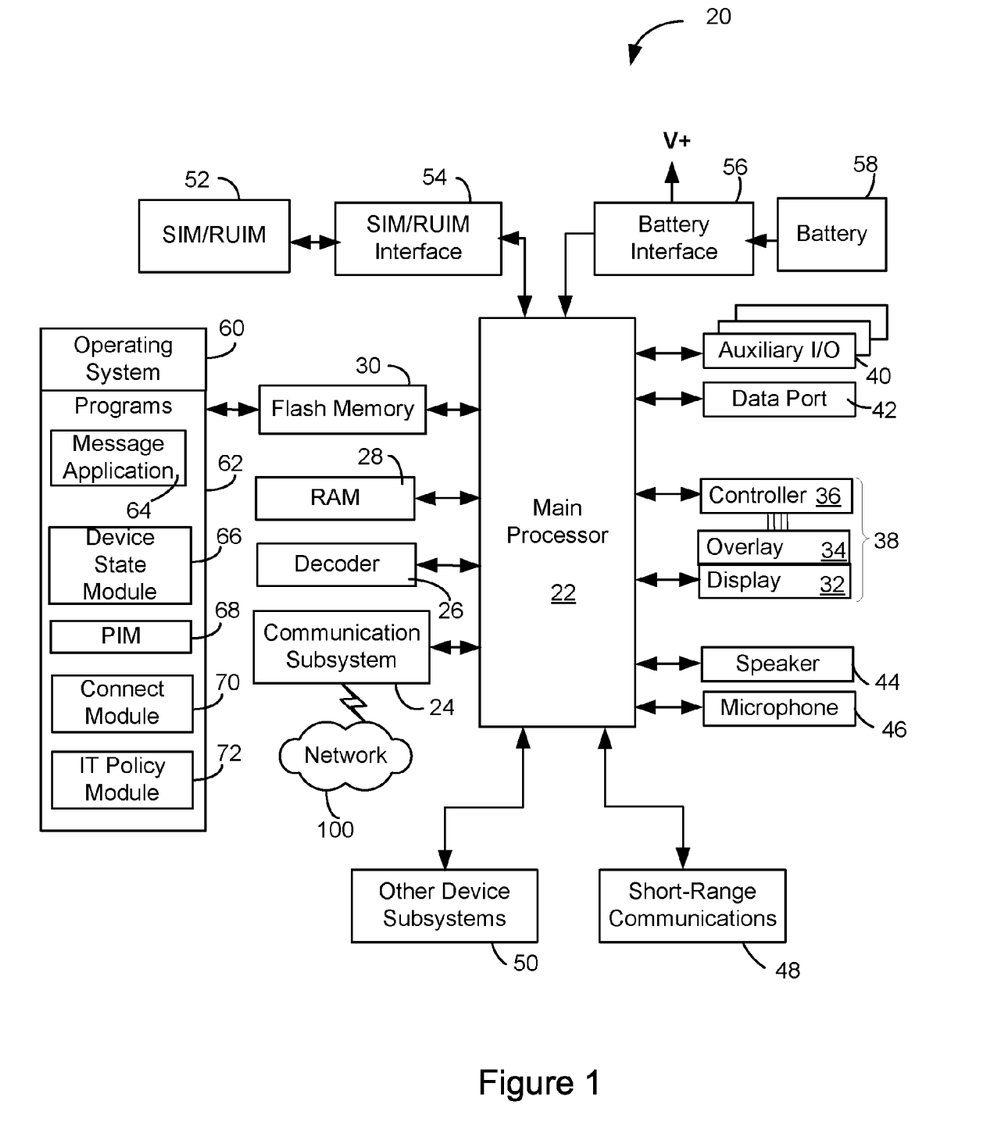
FIG. 1 is a simplified block diagram of components including internal components of a portable electronic device according an aspect of an embodiment.

Referring to FIG. 1, there is shown therein a block diagram of an exemplary embodiment of a portable electronic device 20. The portable electronic device 20 includes a number of components such as the processor 22 that controls the overall operation of the portable electronic device 20. Communication functions, including data and voice communications, are performed through a communication subsystem 24. Data received by the portable electronic device 20 can be decompressed and decrypted by a decoder 26, operating according to any suitable decompression techniques (e.g. YK decompression, and other known techniques) and encryption techniques (e.g. using an encryption technique such as Data Encryption Standard (DES), Triple DES, or Advanced Encryption Standard (AES)). The communication subsystem 24 receives messages from and sends messages to a wireless network 100. In this exemplary embodiment of the portable electronic device 20, the communication subsystem 24 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 24 with the wireless network 100 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 100 associated with the portable electronic device 20 is a GSM/GPRS wireless network in one exemplary implementation, other wireless networks may also be associated with the portable electronic device 20 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA1000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The processor 22 also interacts with additional subsystems such as a Random Access Memory (RAM) 28, a flash memory 30, a display 32 with a touch-sensitive overlay 34 connected to an electronic controller 36 that together make up a touch screen display 38, an auxiliary input/output (I/O) subsystem 40, a data port 42, a speaker 44, a microphone 46, short-range communications 48 and other device subsystems 50. The touch-sensitive overlay 34 and the electronic controller 36 provide a touch-sensitive input device and the processor 22 interacts with the touch-sensitive overlay 34 via the electronic controller 36.

Some of the subsystems of the portable electronic device 20 perform communication-related functions, whereas other subsystems may provide "resident" or on-device functions. By way of example, the display 32 and the touch-sensitive overlay 34 may be used for both communication-related functions, such as entering a text message for transmission over the network 100, and device-resident functions such as a calculator or task list.

The portable electronic device 20 can send and receive communication signals over the wireless network 100 after network registration or activation procedures have been completed. Network access is associated with a subscriber or user of the portable electronic device 20. To identify a subscriber according to the present embodiment, the portable electronic device 20 uses a SIM/RUIM card 52 (i.e. Subscriber Identity Module or a Removable User Identity Module) inserted into a SIM/RUIM interface 54 for communication with a network such as the network 100. The SIM/RUIM card 52 is one type of a conventional "smart card" that can be used to identify a subscriber of the portable electronic device 20 and to personalize the portable electronic device 20, among other things. In the present embodiment the portable electronic device 20 is not fully operational for communication with the wireless network 100 without the SIM/RUIM card 52. By inserting the SIM/RUIM card 52 into the SIM/RUIM interface 54, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM/RUIM card 52 includes a processor and memory for storing information. Once the SIM/RUIM card 52 is inserted into the SIM/RUIM interface 54, it is coupled to the processor 22. In order to identify the subscriber, the SIM/RUIM card 52 can include some user parameters such as an International Mobile Subscriber Identity (IMSI). An advantage of using the SIM/RUIM card 52 is that a subscriber is not necessarily bound by any single physical portable electronic device. The SIM/RUIM card 52 may store additional subscriber information for a portable electronic device as well, including datebook (or calendar) information and recent call information. Alternatively, user identification information can also be programmed into the flash memory 30.

The portable electronic device 20 is a battery-powered device and includes a battery interface 56 for receiving one or more rechargeable batteries 58. In at least some embodiments, the battery 58 can be a smart battery with an embedded microprocessor. The battery interface 56 is coupled to a regulator (not shown), which assists the battery 58 in providing power V+ to the portable electronic device 20. Although current technology makes use of a battery, future technologies such as micro fuel cells may provide the power to the portable electronic device 20.

The portable electronic device 20 also includes an operating system 60 and software components 62 to 72 which are described in more detail below. The operating system 60 and the software components 62 to 72 that are executed by the processor 22 are typically stored in a persistent store such as the flash memory 30, which may alternatively be a read-only memory (ROM) or similar storage element (not shown). Those skilled in the art will appreciate that portions of the operating system 60 and the software components 62 to 72, such as specific device applications, or parts thereof, may be temporarily loaded into a volatile store such as the RAM 28. Other software components can also be included, as is well known to those skilled in the art.

The subset of software applications 62 that control basic device operations, including data and voice communication applications, will normally be installed on the portable electronic device 20 during its manufacture. Other software applications include a message application 64 that can be any suitable software program that allows a user of the portable electronic device 20 to send and receive electronic messages. Various alternatives exist for the message application 64 as is well known to those skilled in the art. Messages that have been sent or received by the user are typically stored in the flash memory 30 of the portable electronic device 20 or some other suitable storage element in the portable electronic device 20. In at least some embodiments, some of the sent and received messages may be stored remotely from the device 20 such as in a data store of an associated host system that the portable electronic device 20 communicates with.

The software applications can further include a device state module 66, a Personal Information Manager (PIM) 68, and other suitable modules (not shown). The device state module 66 provides persistence, i.e. the device state module 66 ensures that important device data is stored in persistent memory, such as the flash memory 30, so that the data is not lost when the portable electronic device 20 is turned off or loses power.

The PIM 68 includes functionality for organizing and managing data items of interest to the user, such as, but not limited to, e-mail, contacts, calendar events, voice mails, appointments, and task items. A PIM application has the ability to send and receive data items via the wireless network 100. PIM data items may be seamlessly integrated, synchronized, and updated via the wireless network 100 with the portable electronic device subscriber's corresponding data items stored and/or associated with a host computer system. This functionality creates a mirrored host computer on the portable electronic device 20 with respect to such items. This can be particularly advantageous when the host computer system is the portable electronic device subscriber's office computer system.

The portable electronic device 20 also includes a connect module 70, and an information technology (IT) policy module 72. The connect module 70 implements the communication protocols that are required for the portable electronic device 20 to communicate with the wireless infrastructure and any host system, such as an enterprise system, that the portable electronic device 20 is authorized to interface with.

The connect module 70 includes a set of APIs that can be integrated with the portable electronic device 20 to allow the portable electronic device 20 to use any number of services associated with the enterprise system. The connect module 70 allows the portable electronic device 20 to establish an end-to-end secure, authenticated communication pipe with the host system. A subset of applications for which access is provided by the connect module 70 can be used to pass IT policy commands from the host system to the portable electronic device 20. This can be done in a wireless or wired manner. These instructions can then be passed to the IT policy module 72 to modify the configuration of the device 20. Alternatively, in some cases, the IT policy update can also be done over a wired connection.

Other types of software applications can also be installed on the portable electronic device 20. These software applications can be third party applications, which are added after the manufacture of the portable electronic device 20. Examples of third party applications include games, calculators, utilities, etc.

The additional applications can be loaded onto the portable electronic device 20 through at least one of the wireless network 100, the auxiliary I/O subsystem 40, the data port 42, the short-range communications subsystem 48, or any other suitable device subsystem 50. This flexibility in application installation increases the functionality of the portable electronic device 20 and may provide enhanced on-device functions, communication-related functions, or both. For example, secure communication applications may enable electronic commerce functions and other such financial transactions to be performed using the portable electronic device 20.

The data port 42 enables a subscriber to set preferences through an external device or software application and extends the capabilities of the portable electronic device 20 by providing for information or software downloads to the portable electronic device 20 other than through a wireless communication network. The alternate download path may, for example, be used to load an encryption key onto the portable electronic device 20 through a direct and thus reliable and trusted connection to provide secure device communication.

The data port 42 can be any suitable port that enables data communication between the portable electronic device 20 and another computing device. The data port 42 can be a serial or a parallel port. In some instances, the data port 42 can be a USB port that includes data lines for data transfer and a supply line that can provide a charging current to charge the battery 58 of the portable electronic device 20.

The short-range communications subsystem 48 provides for communication between the portable electronic device 20 and different systems or devices, without the use of the wireless network 100. For example, the short-range communications subsystem 48 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download is processed by the communication subsystem 24 and input to the processor 22. The processor 22 then processes the received signal for output to the display 32 or alternatively to the auxiliary I/O subsystem 40. A subscriber may also compose data items, such as e-mail messages, for example, using the touch-sensitive overlay 34 on the display 32 that are part of the touch screen display 38, and possibly the auxiliary I/O subsystem 40. The auxiliary subsystem 40 may include devices such as: a mouse, track ball, infrared fingerprint detector, or a roller wheel with dynamic button pressing capability. A composed item may be transmitted over the wireless network 100 through the communication subsystem 24.

For voice communications, the overall operation of the portable electronic device 20 is substantially similar, except that the received signals are output to the speaker 44, and signals for transmission are generated by the microphone 46. Alternative voice or audio I/O subsystems, such as a voice message recording subsystem, can also be implemented on the portable electronic device 20. Although voice or audio signal output is accomplished primarily through the speaker 44, the display 32 can also be used to provide additional information such as the identity of a calling party, duration of a voice call, or other voice call related information.

Figure 2:
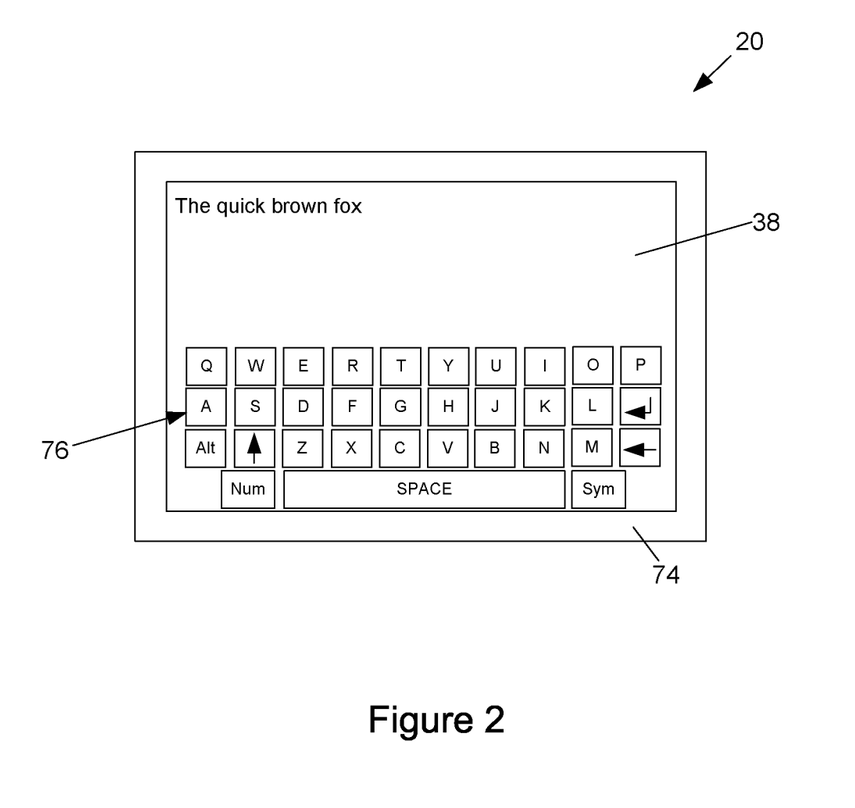
FIG. 2 shows a front view of an exemplary portable electronic device.

Reference is now made to FIG. 2, which shows a front view of an exemplary portable electronic device 20. The portable electronic device 20 includes a housing 74 that houses the internal components that are shown in FIG. 1 and frames the touch screen display 38 such that the touch screen display 38 is exposed for user-interaction therewith when the portable electronic device 20 is in use. In the example shown in FIG. 2, the touch screen display 38 includes a virtual keyboard 76 for user entry of data in the form of, for example, text during operation of the portable electronic device 20 such as in an electronic mail application, during electronic mail composition or in any other suitable application. The virtual keyboard 76 is shown for exemplary purposes and the present application is not limited to a virtual keyboard 76 as other user-selectable options are possible. Further, other keyboards including reduced keyboards are possible.

The touch screen display 38 is a capacitive touch screen display. Thus, the capacitive touch screen display 38 includes the display 32 and the touch-sensitive overlay 34, which is a capacitive touch-sensitive overlay 34. It will be appreciated that the capacitive touch-sensitive overlay 34 includes a number of layers in a stack and is fixed to the display 32 via a suitable optically clear adhesive. The layers include, for example a substrate fixed to the LCD display 32 by a suitable adhesive, a ground shield layer, a barrier layer, a pair of capacitive touch sensor layers separated by a substrate or other barrier layer, and a cover layer fixed to the second capacitive touch sensor layer by a suitable adhesive. The capacitive touch sensor layers can be any suitable material such as patterned indium tin oxide (ITO).

In the present example, the X and Y location of a touch event are both determined with the X location determined by a signal generated as a result of capacitive coupling with one of the touch sensor layers and the Y location determined by the signal generated as a result of capacitive coupling with the other of the touch sensor layers. Each of the touch-sensor layers provides a signal to the controller 36 as a result of capacitive coupling with a suitable object such as a finger of a user or a conductive object held in a bare hand of a user resulting in a change in the electric field of each of the touch sensor layers. The signals represent the respective X and Y touch location values. It will be appreciated that other attributes of the user's touch on the touch screen display 38 can be determined. For example, the size and the shape of the touch on the touch screen display 38 can be determined in addition to the location (X and Y values) based on the signals received at the controller 36 from the touch sensor layers.

Referring still to FIG. 2, it will be appreciated that a user's touch on the touch screen display 38 is determined by determining the X and Y touch location and user-selected input is determined based on the X and Y touch location and the application executed by the processor 22. In the exemplary screen shown in the front view of FIG. 2, the application provides the virtual keyboard 76 and the button of the virtual keyboard 76 selected by the user is matched to the X and Y touch location. Thus, the button selected by the user is determined based on the X and Y touch location and the application. In the example shown in FIG. 2, the user enters text via the virtual keyboard 76.

Figure 3:
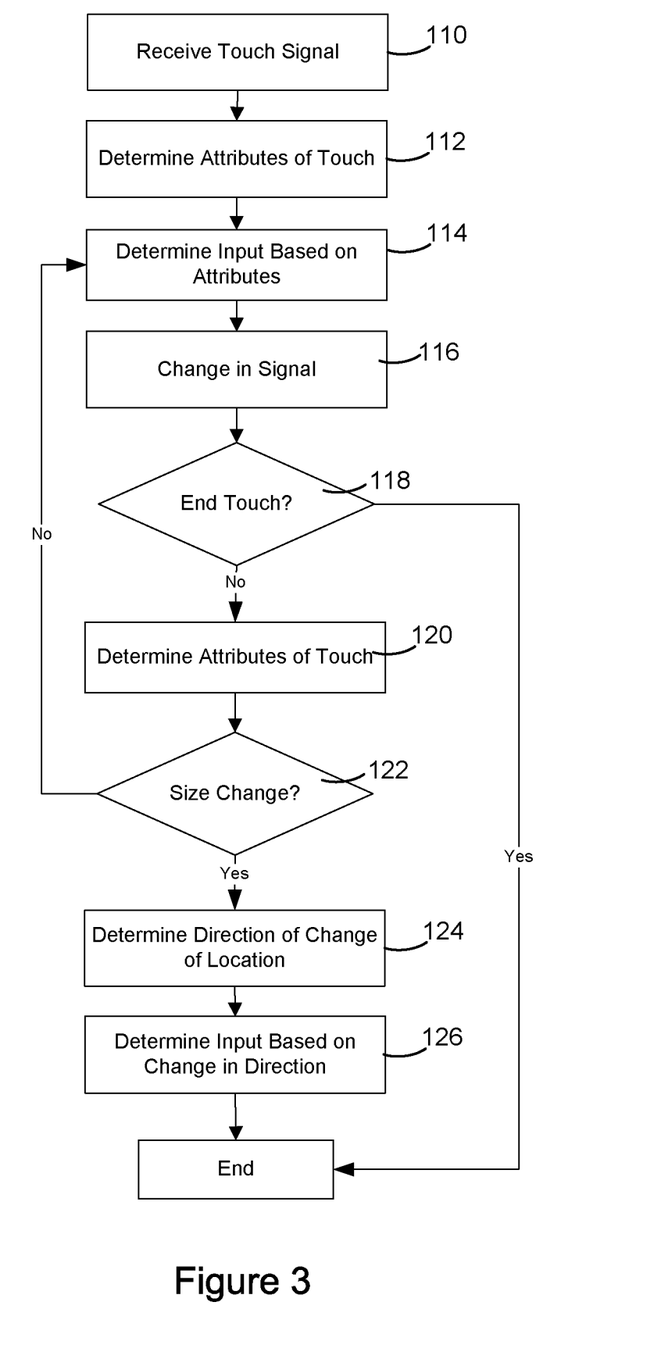
FIG. 3 is a flow chart illustrating steps in a method of determining user-selected input in accordance with an aspect of an embodiment.

Reference is now made to FIG. 3 to describe a method of determining user-selected input in accordance with one embodiment. It will be appreciated that the steps of FIG. 3 are carried out by routines or subroutines of software executed by the processor 22. Coding of software for carrying out such steps is well within the scope of a person of ordinary skill in the art having regard to the present description.

Capacitive coupling between the user's finger and the capacitive touch screen display 38 causes a change in the electric field and the resultant signal is received at the controller 36 (step 110). The signal is analyzed at the controller 36 and resultant data transmitted to the processor 22. Thus, the X and Y touch location is determined along with other attributes such as the size and the shape of the touch at the touch screen display 38 (step 112). Using the touch attributes and, in particular, the X and Y location data, the input is determined by the processor 22 based on the application (step 114). The signal to the controller 36 changes, for example, when the user lifts the finger from the overlay 34, therefore ending the capacitive coupling between the finger of the user and the overlay 34, or when another finger is placed at another location on the overlay 34 (step 116). It is determined if the change results from the user lifting the finger from the overlay, thereby ending capacitive coupling (step 118). If so, the method ends and the portable electronic device 20 awaits further input from the user. On the other hand, if the user's finger is not lifted from the overlay 34 of the touch screen display 38, the touch attributes are again determined as the changed signal received at step 116 is analyzed at the controller 36 and resultant data transmitted to the processor (step 120). It is then determined if the size of the touch has changed by comparison of the attributes determined at step 120 to attributes determined at step 114 (step 122). The size of the touch can change, for example, by the user placing a second finger on the overlay 34, proximal the first finger. Thus, the signal received at the controller changes in peak location and size as the two fingers are close together. Alternatively, the size of the touch can change by rolling of the finger to touch a larger area on the overlay 34. If it is determined that there is no change in size of the first touch at the overlay 34 of the touch screen display 38, the method proceeds to step 114 to determine input based on the touch attributes. Thus, if a user touches a second location, sufficiently spaced from the first location on the overlay 34 of the touch screen display 38 such that the two touch locations are resolved, the input is again determined based on the touch attributes determined at step 120 and based on the application. If, on the other hand, it is determined that there is a change in the size of the touch, the direction of change of location is determined based on the X and Y values determined at step 120 with X and Y values determined at step 112 (step 124). Thus, if the location of the center of the signal changes with the change in size, the direction of the change is determined. The input is then determined based on the change in direction (step 126).

Figure 4:
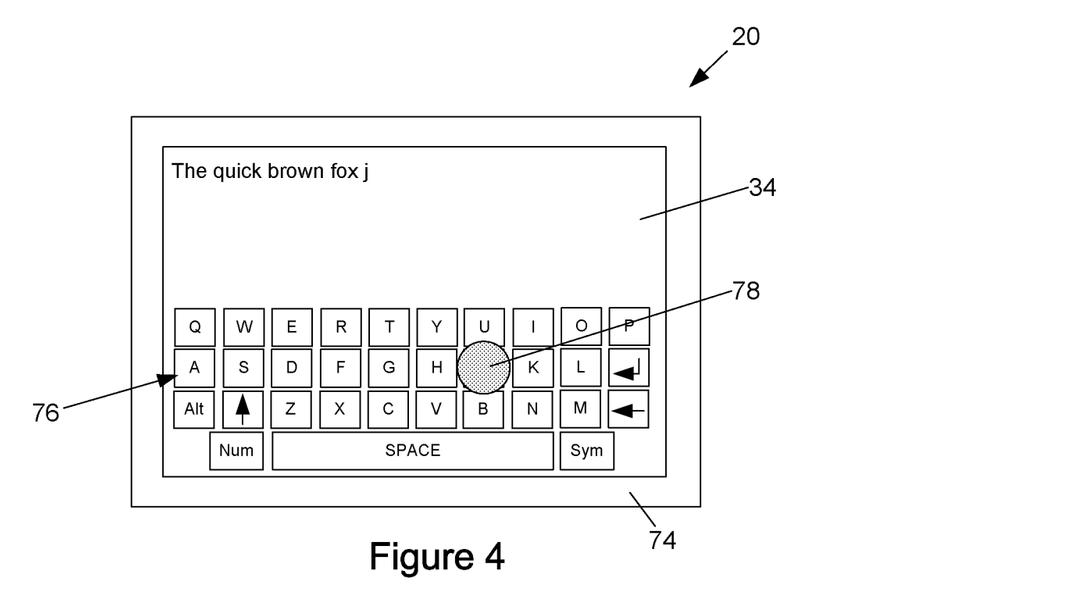
FIG. 4 shows a front view of the portable electronic device of FIG. 2, depicting user-selection of the virtual button corresponding to the letter "J" on a virtual keyboard.
Figure 5:
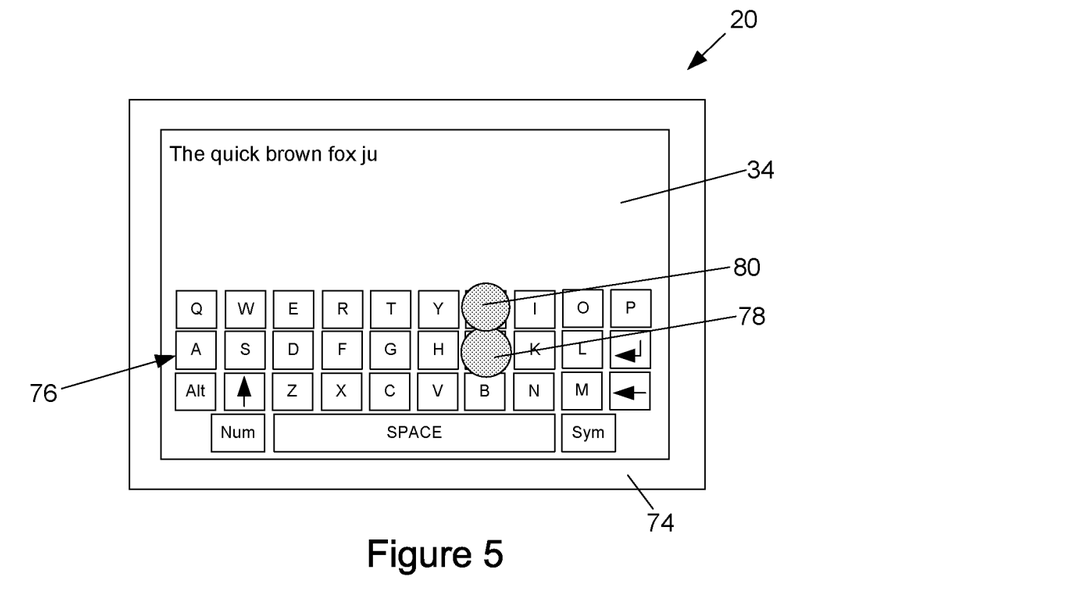
FIG. 5 is a front view of the portable electronic device of FIG. 2, depicting user-selection of the virtual button corresponding to the letter "U".

Continued reference is made to FIG. 3 and to FIGS. 2, 4 and 5 to describe an example of the method of determining user-selected input in accordance with the present embodiment. The present example is provided for better understanding and is not intended to limit the scope of the present application.

In the present example, the portable electronic device 20 runs an application such as a message application or any other suitable application such as an other PIM application, in which the virtual keyboard 76 is provided for user-entry of text. As shown in FIG. 2, the user has entered text by touching the virtual keyboard at button locations corresponding to the letters entered, in sequence. When one of the virtual buttons is touched, the touch signal is received at the controller as a result of capacitive coupling between the finger of a user and the overlay 34 of the touch screen display 38 (step 110).

The signal is analyzed at the controller 36 and resultant data transmitted to the processor 22. Thus, the X and Y touch location is determined along with other attributes including the size and the shape of the touch at the touch screen display 38 (step 112). Using the touch attributes and, in particular, the X and Y location data, the input is determined by the processor 22 based on the application (step 114). In the present example, the input is determined by mapping the X and Y location data to the button of the virtual keyboard provided. Thus, the corresponding letter is entered in the text. Next, a change in signal is determined as the user lifts the finger from the overlay 34 of the touch screen display 38 (step 116). It is determined at step 118 that the capacitive coupling with the overlay 34 has ended and therefore process ends.

In another example, the portable electronic device 20 runs an application such as a message application or any other suitable application such as an other PIM application, in which the virtual keyboard 76 is provided for user-entry of text. When one of the virtual buttons is touched, the touch signal is received at the controller as a result of capacitive coupling between the user's finger and the overlay 34 of the touch screen display 38 (step 110).

The signal is analyzed at the controller 36 and resultant data transmitted to the processor 22. Thus, the X and Y touch location is determined along with other attributes including the size and the shape of the touch at the touch screen display 38 (step 112). Using the touch attributes and, in particular, the X and Y location data, the user-selected input is determined by the processor 22 based on the application (step 114). In the present example, the user-selected input is determined by mapping the X and Y location data to the button of the virtual keyboard provided. Thus, the corresponding letter is entered in the text. Next, a change in signal is determined as the user places another finger on the overlay 34 of the touch screen display 38, at a second location sufficiently spaced from the location of the first finger for resolving the separate touch locations (step 116). It is determined at step 118 that capacitive coupling has not ended and therefore the change in signal is not a result of the user lifting the first finger from the overlay 34. The touch attributes are again determined as the changed signal is analyzed at the controller 36 and resultant data transmitted to the processor (step 120). It is determined that the size of the first touch has not changed by a comparison of attributes from step 120 to attributes previously determined at step 114 (step 122). The second user-selected input is then determined based on the attributes of the second touch (step 114) and the corresponding letter is entered in the text. Thus, the portable electronic device determines the additional user-selected option.

In a further example, the portable electronic device 20 is runs an application such as a message application or any other suitable application in which the virtual keyboard 76 is provided for user-entry of text. When one of the virtual buttons is touched, the touch signal is received at the controller as a result of capacitive coupling between the user's finger and the overlay 34 of the touch screen display 38 (step 110).

The signal is analyzed at the controller 36 and resultant data transmitted to the processor 22. Thus, the X and Y touch location is determined along with other attributes including the size and the shape of the touch at the touch screen display 38 (step 112). Using the touch attributes and, in particular, the X and Y location data, the user-selected input is determined by the processor 22 based on the application (step 114). In the present example, the user-selected input is determined by mapping the X and Y location data to the button of the virtual keyboard provided. Thus, the corresponding letter is entered in the text. As shown in FIG. 4, the first touch location 78 corresponds to the letter "J" on the virtual keyboard and therefore the letter is added to the text.

Next, a change in signal is determined as the user places a second finger on the overlay 34 of the touch screen display 38, at a location adjacent the first finger (step 116). In the present example, the user places the second finger on the overlay 34 at a second touch location 80 corresponding to the button for the letter "U" of the virtual keyboard 76, as shown in FIG. 5. It is determined at step 118 that the change in signal is not a result of the user lifting the finger from the overlay 34. The touch attributes are again determined as the changed signal is analyzed at the controller 36 and resultant data transmitted to the processor (step 120). As indicated, the user places the second finger on the overlay 34 at a location corresponding to the button for the letter "U" of the virtual keyboard 76. The two touch locations "J" and "U" are adjacent on the virtual keyboard 76 in the present example and the two touches are not resolved as separate touch locations by the controller 36. Thus, a single touch location is determined at step 120. Touch attributes, however, including the X and Y location and the size differ from the attributes determined at step 114. The change in size is determined by comparison of attributes determined from the first touch signal and the attributes determined from the changed touch signal (step 122). With the change in size, the direction of change of location is then determined. As indicated, the touch signals for the adjacent touch locations are not resolved as a single signal is determined. The X and Y location of the center of the signal differs from that determined at step 114, however, as the location of the center of the signal shifts in the direction of the second touch location. Thus, in the present example, the center of the signal shifts from the X and Y location corresponding to the letter "J" toward the X and Y location corresponding to the letter "U" on the virtual keyboard 76. The direction of change of location is determined to be toward the X and Y location corresponding to the letter "U" on the virtual keyboard 76 at step 124 and the second user-selected input is then determined to be the letter "U" based on the direction of change. The second user-selected input is determined by determining the next closest option in the direction of change of location.

According to one aspect, there is provided a method of determining user-selections from at least one touch at a touch-sensitive input surface of an electronic device. The method includes determining a first user-selection based on touch attributes, detecting changes in the touch attributes including a change in the location, and determining a second user-selection based on a direction of the change in location.

The changes in the touch attributes detected can include a change in size.

The touch-sensitive input surface can be part of a touch screen display and the first user-selection can be determined from one of a plurality of user-selectable options on a graphical user interface. The second user-selection can also be determined from the plurality of user-selectable options. The first and second user-selections can be adjacent each other.

The first and second user-selections can be buttons of a virtual keyboard on a touch screen display and the second user-selected button can be adjacent the first.

The touch attributes are determined based on the touch signal prior to determining the first user-selection and the change in touch attributes is detected by determining a change in the touch signal.

According to another aspect, there is provided an electronic device that includes a housing, a display device exposed by the housing and a touch-sensitive input device overlying the display device. Functional components in the housing include a memory device and processor operably connected to the display device the touch-sensitive input device, and the memory device for executing a program stored in the memory to cause the electronic device to perform the above method.

The touch-sensitive input device can include a touch-sensitive overlay and a controller connected to the touch-sensitive overlay and the processor.

The touch-sensitive input device can be a capacitive touch-sensitive input device.

According to yet another aspect, there is provided a computer-readable medium having computer-readable code embodied therein for execution by a processor for determining a first user-selection based on touch attributes, detecting changes in the touch attributes including a change in size and a change in the location, and determining a second user-selection based on a direction of the change in location.

Advantageously, when more than two fingers contact the touch-sensitive input surface at locations that are close together, for example when selecting adjacent letters on a virtual keyboard displayed on the touch-screen, each selection can be resolved. The first selection is determined followed by determination of the second selection, even when the first selection is still depressed by the user. Thus, multiple touches can be resolved, even when close together. In a further example, a shift key can be selected followed by selection of a letter or other key proximal the shift key while still holding down the shift key, to provide a capital letter.

When two fingers, for example, contact the touch-sensitive input surface at locations that are close together, for example when selecting adjacent letters on a virtual keyboard displayed on the touch-screen display, each selection can be resolved. The first selection is determined followed by determination of the second selection, even when the first selection is still depressed by the user. Thus, multiple touches can be resolved, even when close together. In a further example, a shift key can be selected followed by selection of a letter or other key proximal the shift key while still holding down the shift key, to provide a capital letter. This reduces erroneous input as user-entry of successive letters or keys on a keyboard can be resolved, reducing input time required. It will be appreciated that reduced input time is particularly advantageous in portable electronic devices as such reductions translate to reduced power usage and therefore increased battery life between charging.

It will be appreciated that the present application is not limited to the use of the virtual keyboard shown as many other keyboard types are possible including, for example, reduced keyboards. Further, other user-selectable options on the touch screen display 38 are possible and the present application is not limited to user-selectable options on a virtual keyboard.

While the embodiments described herein are directed to particular implementations of the electronic device and the method of determining user-selected input, it will be understood that modifications and variations may occur to those skilled in the art. All such modifications and variations are believed to be within the sphere and scope of the present application.

What is claimed is:

1. A method comprising:
   determining a first selection based on touch attributes of a touch on a touch screen display;
   detecting changes in the touch attributes including size of the touch;
   when a change in size of the touch is detected,
      determining a direction of change in location of the touch; and
      determining a second selection corresponding to the closest option displayed in the direction of change in the location.

2. The method according to claim 1, wherein determining the first selection comprises determining a first selection of one of a plurality of selectable options displayed on the touch screen display.

3. The method according to claim 2, wherein determining the second selection comprises determining a second selection of one of the plurality of selectable options.

4. The method according to claim 3, wherein the second selection is adjacent the first selection.

5. The method according to claim 1, wherein determining a first selection comprises determining a first button of a plurality of buttons of a virtual keyboard on the touch screen display and determining a second selection comprises determining a second button of a plurality of buttons of the virtual keyboard.

6. The method according to claim 5, wherein determining the second button comprises determining a button adjacent the first one of buttons.

7. The method according to claim 1, comprising receiving a touch signal and determining touch attributes based on the touch signal prior to determining the first selection.

8. The method according to claim 7, wherein detecting the change in touch attributes comprises detecting a changed touch signal.

9. The method according to claim 8, wherein detecting the change in touch attributes comprises determining touch attributes based on the changed touch signal.

10. The method according to claim 1, wherein detecting the change in touch attributes comprises determining an increase in size and a change in location of the at least one touch.

11. An electronic device comprising:
    a touch-sensitive input device overlying a display;
    a processor operably coupled to the touch-sensitive input device and configured to determine a first selection based on touch attributes of at least one touch on the touch-sensitive input device, detect changes in the touch attributes including size of the at least one touch, when a change in size of the at least one touch is detected, determine a direction of change in location of the at least one touch and determine a second selection corresponding to the closest option displayed in the direction of the change in the location.

12. The electronic device according to claim 11, wherein the touch sensitive input device comprises a touch-sensitive overlay and a controller connected to the touch-sensitive overlay and the processor.

13. The electronic device according to claim 12, wherein the touch-sensitive input device comprises a capacitive touch-sensitive input device.

14. A non-transitory computer-readable medium having computer-readable code embodied therein executable by a processor of an electronic device for causing the electronic device to determine a first selection based on touch attributes of at least one touch on a touch screen display of the electronic device, detect changes in the touch attributes including size of the at least one touch, when a change in the size of the at least one touch is detected, determine a direction of change in location of the at least one touch and determine a second selection corresponding to the closest option displayed in the direction of the change in location.

15. A method comprising:
determining a first selection of one of a plurality of selectable options displayed on a touch screen display based on touch attributes of at least one touch on the touch screen display;
detecting changes in the touch attributes including size of the at least one touch;
when a change in size of the at least one touch is detected, determining a direction of change in location of the at least one touch and
determining a second selection of the plurality of selectable options corresponding to the closest option displayed in the direction of change in the location.

\* \* \* \* \*